Aug. 28, 1928.

Re. 17,069

E. E. CLEMENT

SUBDIVIDED SERVICE SYSTEM OF RADIO BROADCAST DISTRIBUTION

Original Filed March 22, 1924 2 Sheets-Sheet 1

Inventor

Edward E. Clement

Aug. 28, 1928.

Re. 17,069

E. E. CLEMENT

SUBDIVIDED SERVICE SYSTEM OF RADIO BROADCAST DISTRIBUTION

Original Filed March 22, 1924 2 Sheets-Sheet 2

Inventor

Edward E. Clement

Reissued Aug. 28, 1928. Re. 17,069

UNITED STATES PATENT OFFICE.

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA.

SUBDIVIDED SERVICE SYSTEM OF RADIO BROADCAST DISTRIBUTION.

Original No. 1,522,362, dated January 6, 1925. Serial No. 701,123, filed March 22, 1924. Application for reissue filed March 18, 1926. Serial No. 95,792.

My invention relates to systems of radio broadcast distribution and has for its object the organization of a system capable of giving service to subscribers in regional groups, which may be related to each other by a general organization corresponding to the long distance telephone organization.

I attain my object by relating my subscribers in each area to one or more local central offices, by means of wired circuits, which may conveniently be telephone line circuits. Each subscriber is provided with a standardized form of receiving radiophone, and each central office is also provided with receiving radiophones, but much more elaborate and powerful than those at the subscribers' stations. Local service, that is to say, local broadcasting, is received by the subscriber direct, but when he desires any station except those that are listed as local, he secures a long distance connection through his line wires to a central office radio receiving set capable of picking up and receiving the station he wants. The subscriber's instrument may conveniently be a single tube regenerative set with common battery connections, taking all its current supply over the subscriber's wired circuit. The central office radio sets may conveniently be superheterodynes or the equivalent thereof, capable of receiving from distant stations and transforming the carrier wave length so as to relay or retransmit the original modulations over the subscriber's line on a long carrier wave, preferably at superaudio frequency, such as 30 to 60 kc. per second.

The advantages of this arrangement will be apparent on brief consideration. A single tube set is usually sufficient to give excellent results with local broadcasting, and by using a dynamic receiver, it is even possible to operate therewith a moderately loud table talker or loud speaker. For distance work, the antenna or equivalent wave collector is unnecessary, and the input side is connected through a tuned coupler to the line circuit. The same tube detector in the subscriber's set then receives the distant signals on long waves, without the necessity of elaborate tuning on the part of the subscriber. For the local service, since no operators are required, a flat rate may be charged; but the long distance service is strictly comparable to the long distance service in the telephone exchange, and calls for toll charges apportioned to the amount of service rendered, as well as the investment involved.

My invention is illustrated in the accompanying drawings, in which.

Figure 1:
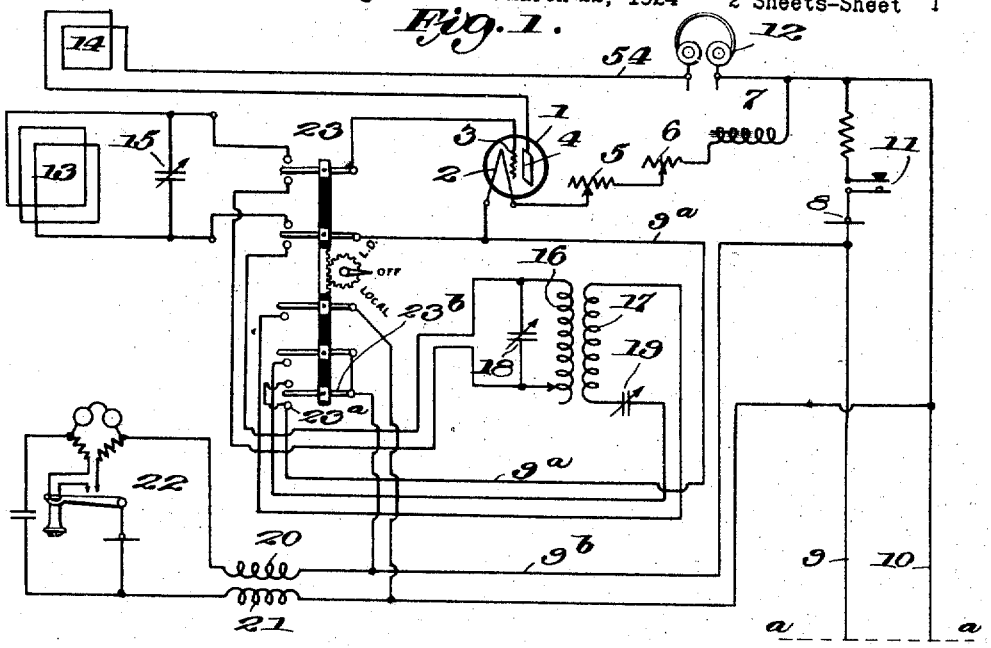
Fig. 1 is a diagram of a subscriber's station.
Figure 2:
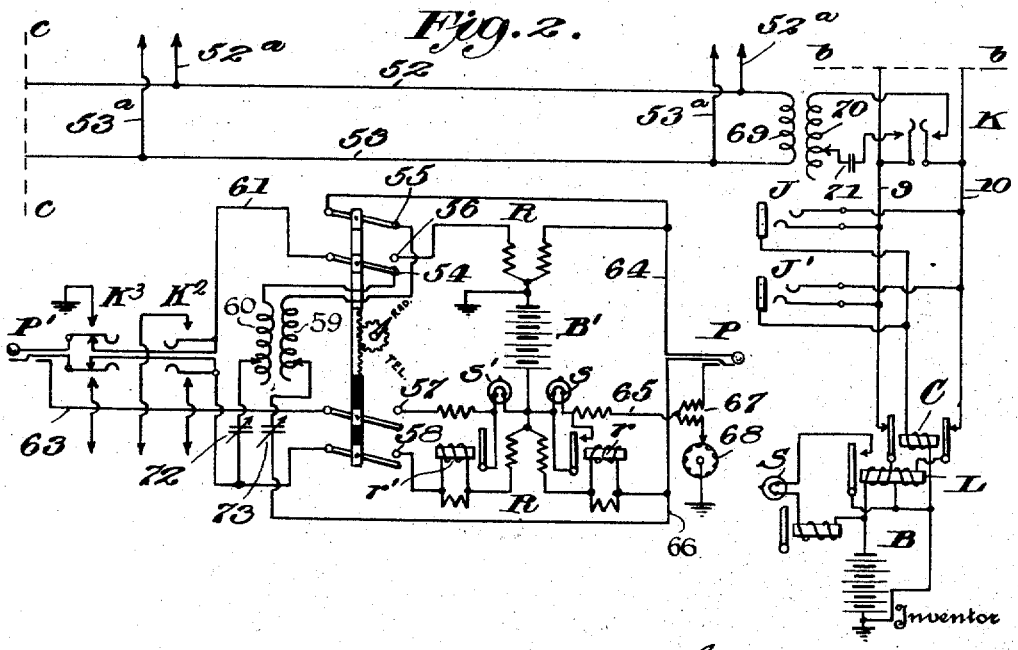
Fig. 2 is a connected diagram of the central office end of the subscriber's wired line circuit, showing terminal devices and switching means therefor.
Figure 3:
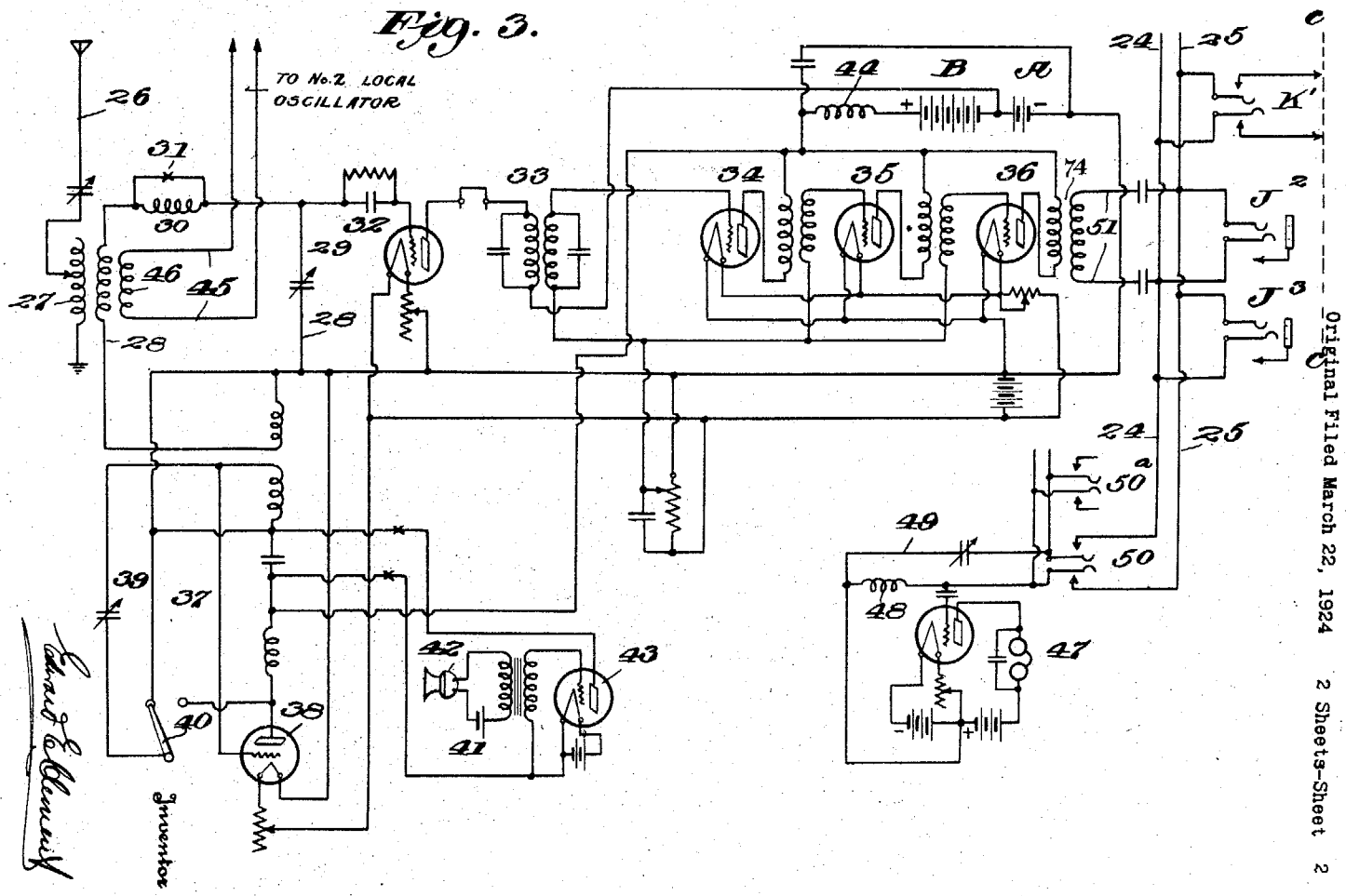
Fig. 3 is a diagram showing a central office superheterodyne receiver with its terminal switching device and an operator's supervisory circuit.

Referring to the drawings, Figs. 1, 2 and 3 are all to be read together, the dotted lines *aa* and *bb* in Figures 1 and 2 being spaced apart to indicate distance between the subscriber's station and the central office; and the dotted lines *cc* in Figs. 2 and 3 being identical and meant to be brought together, so that the jack $J^2$ in Fig. 3 and the plug P′ in Fig. 2 will be adjacent to each other.

Fig. 1 represents a subscriber's instrument. 1 is a detector tube with the usual filament 2, grid 3 and plate 4. 5 and 6 are rheostats, 7 is a choke coil, 8 is a telephone transmitter of standard type adapted to be bridged across the line wires 9 and 10 by the push button or key 11, which however, opens as soon as pressure is removed from it. 12 is the subscriber's headphone, 13 is a loop antenna for local receiving, 14 is a tickler loop or regenerative coil, 15 is the usual tuning condenser across the loop, 16—17 is a coupler for connecting the instrument to line for long distance receiving, 18 and 19 are tuning condensers for the long distance circuit, 20 and 21 are radio frequency choke coils included in the branch of the ordinary telephone set 22, and 23 is a gang switch adapted to connect the instrument for either long distance or local receiving to the telephone line wires 9—10, or to disconnect it entirely therefrom, at will. There are no batteries at the subscriber's station, all energy for all purposes being supplied over the metallic circuit 9—10, from the telephone exchange central office shown in Fig. 2.

Fig. 2 shows one telephone line 9—10 with the switching terminals in the form of spring jacks J—J′, a line relay L, battery B, cut-off relay C, a signal lamp S. These elements of the line, as shown, are all old and well understood, and for the purpose of connecting this line with others for telephonic use, standard Western Electric No. 1 switchboard cord circuits are supposed to be employed, which however, are not shown separate herein. The line 9—10, and any number of other lines assumed to be taking radio service, must be supplied with centralized current during operation of their radio phones without keeping their signal lamps S burning, this applying to both local and long distance service. For local service no other connection is required at the central office, but for long distance, that is to say, for receiving from distant stations, the subscriber's line must be connected with a central office receiving instrument such as that shown in Fig. 3. The simplest form of connection is a direct connection from the line wires 9—10, to the bus bars 24—25 of the receiving instrument. This connection is shown in Figs. 2 and 3 as established by means of keys K—K′ which may be left normally closed, because radio frequency condensers are included in the circuits. In such case the subscriber can secure long distance service by merely turning his own switch into the proper position. However, this permanent connection would give him access to only one central office receiver, and he would be limited to the program received from stations selected by the central office operators. In order to give him a wider choice, I have indicated also interchangeable switching means consisting of plugs P—P′, cooperating with the line jacks J—J′ on one hand, and with terminal jacks $J^2$ $J^3$ which typify terminals of any desired number of receiving instruments.

The amount of current consumed in the arrangement herein indicated at the subscriber's station, using a UV 199 tube, is 45 milliamperes.

Referring to Fig. 3, the superheterodyne receiver therein shown of itself and as to the details of its construction, forms no part of the present invention. It may be replaced by any convenient form of receiver which will give equivalent range, selectivity, and volume of output. As shown it comprises as its essential elements the following: antenna circuit 26, coupler 27, input circuit 28, provided with the usual tuning devices including condenser 29, and a load coil 30 which may be cut in or out by means of a shunting switch 31, first detector tube 32, coupler 33, and three stages of radio frequency amplification 34, 35, and 36, each including a triode tube and transformer; also a local oscillator circuit 37 including the tube 38, and the usual coils to connect it with the input circuit 28. This oscillator circuit 37 is tunable by means of the condenser 39 and the long wave switch 40 to any wave length through the usual range of broadcasting, as for example from 200 to 600 meters inclusive. To this circuit I have added a local modulating circuit 41, having a microphone transmitter 42, and a modulator tube 43 with the usual connections. It is to be understood that this arrangement is typical only, and may be varied without departing from the invention. The batteries A and B for this receiving set are indicated in the upper part of the figure, and the power connections may be varied, or additional batteries employed, as required in practice. The choke coil which is usually included in the battery branch of the standard modulator circuit is also shown for convenience at 44 in the upper part of the figure.

In order that a continuous program may be furnished when subscribers are connected to long distance, giving them for example a part of the program from a distant station, and then without changing the tuning or their connections, giving them other parts originated locally I add a second local oscillator circuit 45, having a coil 46 so related to the coupler 27 that local oscillations in the circuit 46 may take the place of the carrier waves received from a distant station, thus maintaining the heterodyne effect and the flow of long waves amplified at 34, 35 and 36, to the subscriber's line wires 9—10 and so to his station receiver. Local modulations may then be imposed upon the long waves thus transmitted, by means of either the modulator 41, or a suitable modulator connected to the balancing local oscillator circuit 45.

For the purpose of tuning and supervision, I have shown an operator's receiving set 47, comprising the usual elements of the tube 48, tuned input circuit 49, and a key 50 by which the set may be connected to the output circuit 51 of the superheterodyne. The same operator's set 47 may be used with a plurality of main receiving sets, as indicated by the multiple key $50^a$. Also, the output circuit 51 of each long distance receiving set may have bus bars 24—25 connected to a plurality of switching terminals shown as multiple jacks $J^2$ $J^3$ and switching key K′, so that a plurality of subscribers' lines may be interchangeably connected thereto. It is to be observed that if the volume of output in the circuit 51 is insufficient for a number of lines to be served, any desired and suitable arrangement of tubes or equivalent devices may be employed, to increase the same, either between the circuit 51 and the bus 24—25 or between the bus and the switching terminals and subscribers' lines. Such modifications are well within the scope of the invention, and would include the insertion when necessary of repeaters and amplifiers in the circuits 52—43 leading to individual subscribers' lines.

It should particularly be observed in the present case that I have shown no second detector in Fig. 3, the output circuit 51 delivering a carrier wave at low or beat radio frequency. That is to say, transmission of the received and amplified waves from the receiving set shown in Fig. 3 over the subscribers' lines is at superaudio frequency, which is preferably maintained constant, regardless of the wave length of the station being received at any given time on the antenna circuit 26—27. The second detector is the tube 1 at the subscriber's station, and this arrangement enables me, by providing the proper means, and by properly tuning the radio branches of the lines, to maintain continuous radio service without interfering with the use of the subscriber's wires 9—10 for simultaneous telephonic service. Conversely, the telephonic currents or audio frequency waves, will not disturb the radio receiving, although this is not so important, because in any combined system of this type, preference must be given telephone service. At the subscriber's station, the choke coil 7 guards the filament circuit from both radio and telephone audio currents while the high resistance in the plate circuit 54 (of the order of 20,000 ohms) is sufficient to prevent shunting of the telephone apparatus at the station 22.

Referring to Fig. 2, the plug circuit P—P′ is typical of a long distance radio connecting circuit, by which the subscriber's line 9—10 through a jack J or J′ and a trunk jack $J^2$ or $J^3$ in Fig. 3, may be connected to receive any desired distant station. This cord circuit is what is known as the standard Western Electric No. 1 switchboard cord circuit, with listening and ringing keys $K^2$—$K^3$ respectively, repeating coil RR, supervisory elements *s*—*s*′, supervisory relays *r*—*r*′ and the usual balancing and bypass resistances. The main battery B′ is supposed to have its busses connected in bridge with these cord circuits, and in the diagram its positive pole is shown grounded as usual. For special radio service, however, this ground may be omitted, a separate battery B′ being then employed. Since all of the batteries shown herein are at the central station, they may be combined into one, or may be made separate units, as circumstances and good practice may dictate. In exchanges carrying a heavy radio load, it may be advisable to provide a separate power plant, which may conveniently be used in parallel relation to the telephone power plant, but the relation of the two load curves, that is the radio load and the telephone load, is such that only in very exceptional cases will their peaks coincide or even approach each other. The main telephone peaks occur approximately between 10 and 11 in the morning, and 2 and 3 in the afternoon, with subsidiary peaks at one or two points between 4 and 7 p. m. The radio programs usually come on between 3 and 4 in the afternoon and after 7 in the evening. Subsidiary programs peaks would be between 2 and 3 in the afternoon and 6 and 7 in the evening, with occasional concentration at other hours, as for example when a special speech is broadcasted from Congress, or the like. The variations in the telephone load are due to well established business and social conventions but the distribution of the radio load, (or programs) is to a great extent under the control of those who do the broadcasting. The diurnal variations in efficiency of wave transmission through the ether render distance receiving more effective at night, and this coincides with the hours of leisure of the majority of subscribers, as well as with the low or flat portion of the telephone load curve. In general therefore, it may be said that the two services will not conflict, but will supplement each other according to my system, and this being so, furnishes reason for presenting herein a connecting circuit of the type shown at P—P′ in Fig. 2. In a great many exchanges the same switchboards and the same operators may be employed to switch radio connections that are employed to switch telephone connections. The circuit P—P′ is therefore made convertible, by means of switch contacts 54, 55, 57 and 58. The first two of these control the connection of a radio coupler 59—60, and the other three control the continuity of the ordinary cord circuit connections 61, 62 and 64 to the plug P′, from the battery B′ and repeating coil R. The conductors 64—65 and 66 leading to the plug P are left intact at all times in order to furnish operating current to the subscriber, and to supervise the connection by means of the lamps *s*, with the ancillary purpose of operating the cut-off relay C and putting a special tone test on the multiple jacks, so that the line will not test busy to telephone operators. This tone test 68 is controlled by a switch 67, closed when the cord is in use for radio use, and opened along with the contacts 54—55 when in use for telephone service. When the contacts 54, 55 and 67 are closed for radio service the contacts 56, 57 and 58 are opened, although it has been found that this is not absolutely essential to good radio transmission. One winding of each coil R is left between the battery B′ and the conductors 64 and 66, and may be supplemented by a radio choke coil, if the battery B′ is the same as or is connected with the main telephone battery, the purpose being to keep the radio waves off the battery busses.

As previously pointed out, instead of being connected through the cord circuit P—P′, the subscriber's line 9—10 may be connected to the central office distant receiver of Fig. 3 by means of the circuit 52—53, provided with switches at both ends. As a matter of fact, the circuit 52—53, instead of being individual, may be common to a number of lines as indicated by the branch wires $52^a$ and $53^a$, the single pair 52—53 thus becoming an extension of the output bus. The transmission over the line 9—10 is facilitated by turning both ends of the line, as well understood in the art, and I therefore include a coupler 69—70 and a tuning condenser 71, the elements 70—71 being bridged across the line by the key K. These elements in conjunction with the corresponding elements 17—19 at the subscriber's station not only render the transmission better, but effectually absorb the radio waves and block audio waves over the line. The elements 69—60—71 find their counterparts in the cord circuits at 59—60 and 73, for the same purpose; and since there is thus a coupler always interposed between the output bus of the superheterodyne and the subscriber's line, the last transformer 74 shown connected with the output circuit 51 may be omitted if desired. In the cord circuit I have also shown a tuning condenser 72; and it is to be noted that in the output circuit 51 (Fig. 3) there are two fixed condensers, intended to prevent any possible short-circuiting of telephone or battery currents through the secondary of the transformer 74. These may be omitted if tuning condensers are employed as at 72 in series with the coil 59.

The operation of my system thus described is as follows:

The subscriber's station in Fig. 1 is shown with all parts in a condition of disuse. If the subscriber desires telephone service, he removes his telephone receiver from the hook and thereby signals central through the parts L and S, as usual. A cord circuit which may be that shown at P—P′, with the contacts 56, 57 and 58 closed and the contacts 54—55 opened, is then employed, to answer, test, connect, ring the wanted subscriber, and supervise, as usual. If, on the other hand the subscriber desires radiophone service, he sets his switch for local or long distance, as the case may be. Assuming that he desires only local receiving, and that sufficient battery current for the filament 2 may flow through the line without disturbing the central office signal S or protective devices, he need do nothing further. If he desires long distance receiving however, he calls the operator in the usual way, either by means of his ordinary telephone set, or by means of the transmitter 8 controlled by the push button 11 associated with the radio set. In accordance with standard practice, distant stations will be numbered, and in response to the inquiry "Number, please", the subscriber gives the number, as for example "Radio, 412". The operator then connects him with the superheterodyne receiver of Fig. 3 which can give him the station he wants, and if necessary communicates at the same time through an order circuit with the radio operator in charge of the radio receiving apparatus. As an alternative, and in accordance with long distance practice, the local or A operator may answer the call and learning it is for radio may communicate with the radio operator over an order circuit, and the radio operator will then connect with one of the multiple terminals of the calling subscriber's line, ascertaining direct from the subscriber what station he wants, and setting up the necessary radio connections accordingly. This arrangement has the obvious advantage of avoiding a tie up of the operator's cords on an A board or answering positions. This method may be practiced with the same circuits and apparatus shown in Fig. 2, if it be understood that the cord circuit P—P′ is a radio operator's cord circuit, and that while the A or answering operators on a telephone switchboard may have similarly equipped cords for convenience, the load is carried on the radio switchboard, containing multiples of the subscriber's line, and this radio switchboard may be automatic or manual or semi-automatic in its mode of operation. This method has also the additional advantage that the calling and switching to the radio-board may be simplified by establishing a conventional form of radio calling, which may be made by flashing line lamp S. The A operator perceiving a line lamp to flash, would know that the line desired long distance radio connection, and would pass the call to the radio operator as before stated, using an order circuit. If the lamp burns steadily, it would indicate a desire for telephone connection, and where the subscriber is using his instrument for local radio receiving there would preferably be no indication at all on the lamp S.

What I claim is:

1. In a radiophone system of broadcast distribution, a central station and lines leading therefrom to subscribers' stations, radiophone receivers at the subscribers' stations arranged to be supplied with operating current over the line, means at the central station for supplying current over the lines, broadcast transmitting means at the central station, link circuits at the central station and switching means associated with a link circuit for adapting it either to the interconnection of subscribers' lines with each other or to the connection of said transmitting means with subscribers' line.

2. In a radiophone system of broadcast distribution, a central station and subscribers' stations with lines interconnecting the same, radio receiving sets at the subscribers' stations connected with the line to take operating current therefrom, means at the central station for supplying said current over the line, means for transmitting a modulated super audio frequency carrier current over the lines, a receiving circuit at each subscriber's station tuned to the frequency of said carrier current, and means at each subscriber's station for connecting the input side of the said radio receiving set through the said carrier current frequency tuned receiving circuit to the line.

3. In a radiophone system of broadcast distribution, a central station and subscribers' stations, radiophone receiving sets at the subscribers' stations, an antenna at each subscriber's station, means for operatively connecting the input circuit of the subscriber's set with either the antenna or the line, and means operable upon the switching of said input circuit from the antenna to the line to automatically change the tuning of said receiving set from short wave lengths to long wave lengths.

4. In a radiophone system of broadcast distribution, a central station and subscribers' stations, a network of wire lines interconnecting them, radiophone receiving sets at the subscribers' stations, a receiving antenna at each subscriber's station, means for distributing broadcast matter over the lines by wired radio and means at a subscriber's station for switching the subscriber's radio receiving apparatus from radio to wired radio.

5. In a radiophone system of broadcast distribution, a common battery telephone system having subscribers' stations and lines interconnecting the same, radiophone receivers at the subscribers' stations, means at a subscriber's station for receiving radio broadcast on the radio receiver, means for distributing broadcast matter over the telephone lines by wired radio, and means at the subscriber's station for switching the subscriber's radio receiver from radio to wired radio.

6. In a radiophone system of broadcast distribution, a central station and lines leading therefrom to subscribers' stations, radiophone receivers at the subscribers' stations arranged to be supplied with operating current over the line, broadcast transmitting means at the central station, link circuits at the central station for connecting said radio transmitting means with the subscribers' lines for transmission thereover by wired radio, means for signalling the central station from the subscriber's station over the line, and means at the subcriber's station for switching the radio receiving set from radio reception to wired radio reception.

7. In a radiophone system of broadcast distribution, a central station and lines leading therefrom to subscribers' stations, radiophone receivers at the subscribers' stations, broadcast transmitting means at the central station, link circuits at the central station, switching means associated with a link circuit for adapting it either to the interconnection of subscribers' lines with each other or to the connection of said transmitting means with subscribers' lines, and switching means at the subscriber's station for switching the radio receiving set from radio reception to line radio reception.

8. In a radiophone system of broadcast distribution, a central station and subscribers' stations with lines interconnecting the same, radio receiving sets at the subscribers' stations, a radio receiving antenna for each subscriber's receiving set, means for transmitting a low frequency carrier current over the lines, a low frequency receiving circuit at each subscriber's station tuned to the said low frequency carrier current, and means at each subscriber's station for connecting the input side of the said radio receiving set to either the antenna circuit or through the low frequency tuned receiving circuit to the line.

9. In a radiophone system of broadcast distribution, a central station and subscribers' stations, radiophone receiving sets at the subscribers' stations each comprising a thermionic tube with plate and filament circuits therefor connected to the line circuit for current supply, a common source of current at the central station connected to the line and of a sufficient voltage to operate said plate circuits thereover, voltage reducing means connected between the line and the filament circuit, an antenna at the subscriber's station, means for operatively connecting the input circuit of the subscriber's set with either the antenna or the line, and means operable upon the switching of said input circuit from the antenna to the line to automatically change the tuning of said receiving set from short wave lengths to long wave lengths.

10. In a radiophone system of broadcast distribution, a central station and subscribers' stations, radiophone receiving sets at the subscribers' stations each comprising a thermionic tube with plate and filament circuits therefor connected to the line circuit for current supply, a common source of current at the central station connected to the line and of a sufficient voltage to operate said plate circuit thereover, voltage reducing means connected between the line and the filament circuit, a receiving antenna at each subscriber's station, means for distributing broadcast matter over the lines by wired radio, and means at a subscriber's station for switching the subscriber's radio receiving apparatus from radio to wired radio.

11. In a radiophone system of broadcast distribution, a common battery telephone system having subscribers' stations and lines interconnecting the same, radiophone receivers at the subscribers' stations supplied with operating current from the central station over the lines, means at the subscriber's station for receiving radio broadcast on the radio receiver, means for distributing broadcast matter over the telephone lines by wired radio, and means at the subscriber's station for switching the subscriber's radio receiver from radio to wired radio.

In testimony whereof I hereunto affix my signature.

EDWARD E. CLEMENT.